UNITED STATES PATENT OFFICE.

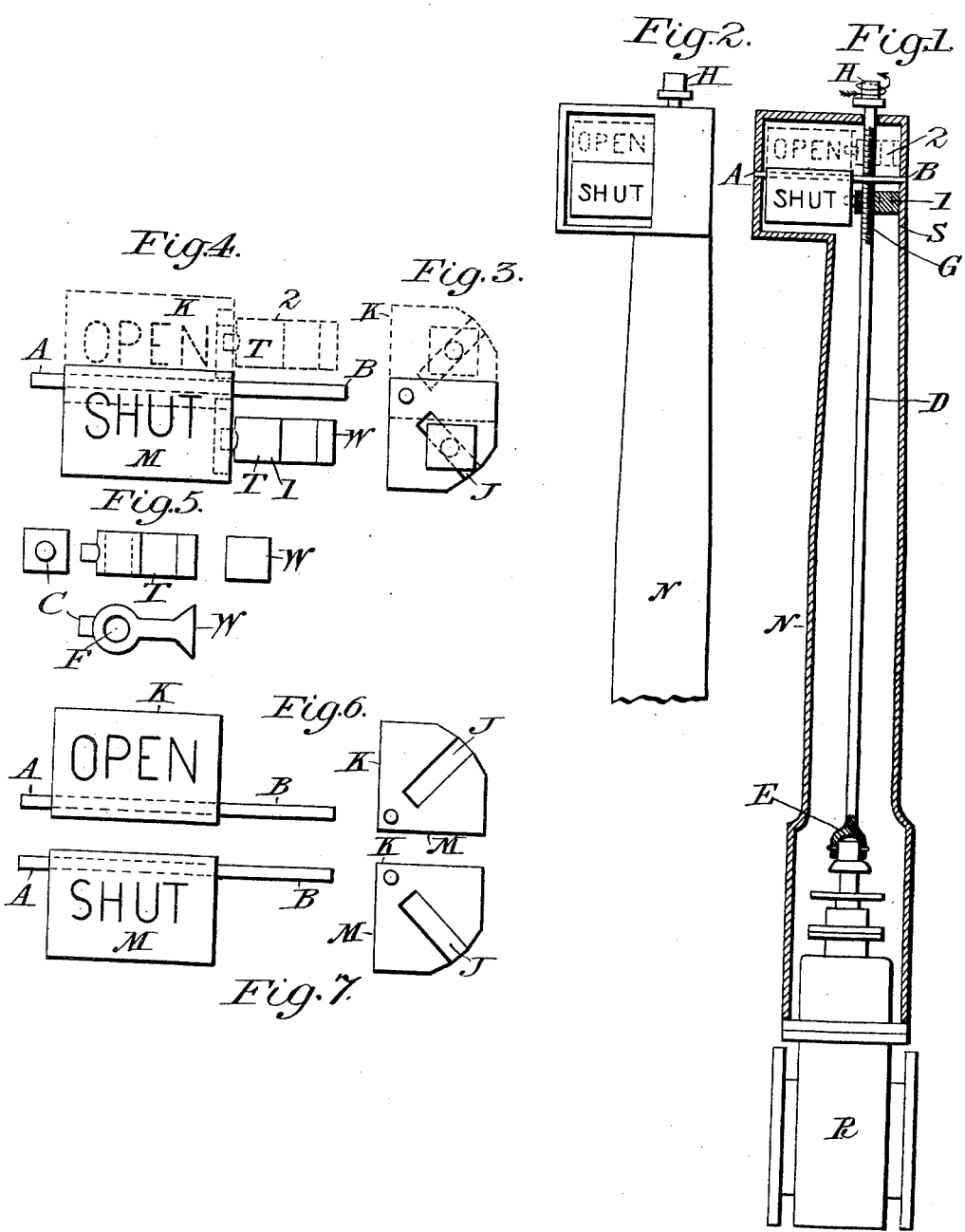

JOHN KNICKERBACKER, OF TROY, NEW YORK.

INDICATOR FOR VALVES.

SPECIFICATION forming part of Letters Patent No. 586,740, dated July 20, 1897.

Application filed October 5, 1895. Serial No. 564,777. (No model.)

*To all whom it may concern:*

Be it known that I, JOHN KNICKERBACKER, a citizen of the United States, residing at Troy, in the county of Rensselaer, State of New York, have invented a new and useful Indicator for Use on Valves or on Indicator-Posts, of which the following is a specification.

My invention has to do with an indicator to show the position of the gates in a valve by means of an external arrangement which has a proportional movement in relation to the gates in the valve-body. The position of the gates in the valve is made known by means of a block, on two adjacent sides of which are respectively the words "Open" and "Shut" and which is so moved by the mechanism to be hereinafter described that when the valve is open and the word "Open" is exposed and the word "Shut" is hidden and when the valve is closed the word "Shut" is exposed and the word "Open" concealed. I attain this object by the mechanism illustrated in the accompanying drawings, in which—

Figure 1 is a vertical section of the indicator as applied to an indicator-post, the case of the post being shown in section. Fig. 2 is a vertical view of the upper part of the post. Fig. 3 is an end view of the indicator-block, showing the nut by means of which it is moved. Fig. 4 is a front view of the indicator-block and moving-nut. Fig. 5 gives four views of the indicator-moving nut. Fig. 7 is a front end view of the indicator-block with the word "Open" on the exposed face. Fig. 7 is a front and end view of the indicator-block with the word "Shut" exposed.

Similar letters refer to similar parts throughout the several views.

In a valve having a stationary stem the position of the parts moved by the stem cannot be ascertained without suitable means for transferring proportionately the travel of the interior parts to a mechanism located externally to the valve. By having the stem of the valve outside of the case or the stem connected to the stem of the valve threaded and knowing the proportion between the number of threads per inch on it and the number of threads per inch on the threaded valve-stem the position of the moving parts inside of the valve-case is easily ascertained, but it is necessary in many instances to have the fact of the valve being open or shut positively indicated. The mechanism by means of which I obtain this result is as follows:

To the operating-nut of valve R is attached the socket E of the stem D. The stem D is threaded at its upper end G, so that the travel of the nut T on it is from the position 1 to the position 2 when the valve is moved from shut to open. The nut T is interiorly threaded at F to correspond with the threaded portion G of the valve-stem, and it has the projecting piece C, which is made to fit into the groove J on the indicator-block. The surface W of the nut rests against the surface S of the interior of the indicator-post and prevents the nut from revolving when the stem D is turned to open or close the valve R by means of the nut H. Through the indicator-block passes the axle A B, which is supported at each of its ends in the upper part of the indicator-post. The indicator-block is free to revolve on this as an axis. When the valve is opened by turning the nut H on the stem D, the indicator-nut T moves up on the threaded portion of the stem. As it does so the projecting piece C of the indicator-nut moves in the slot J of the indicator-block, causing the indicator-block to turn on the axis A B until the side K, with the word "Open," is exposed to view. When the valve is closed, the projecting piece C, working in the groove J, carries the indicator-block down, so that when the valve is closed the side M with the word "Shut" is exposed and the word "Open" hidden.

It will be observed that the mechanism used by me is positive in its action and simple of construction. It can be readily told from the position of the block to what degree the valve is open.

What I desire to claim as new and of my own invention is—

In an indicator for valves having a part of the operating-stem outside the valve threaded, and a nut working on said portion of the stem, which nut engages an indicator-block, the combination of an indicator-block which turns, said indicating-block being operated and held by the nut throughout its entire travel, to prevent rotary movement of said block, except as actuated by said nut, substantially as described.

JOHN KNICKERBACKER.

Witnesses:
GEORGE H. COLE,
JOHN HIGGINS.